UNITED STATES PATENT OFFICE.

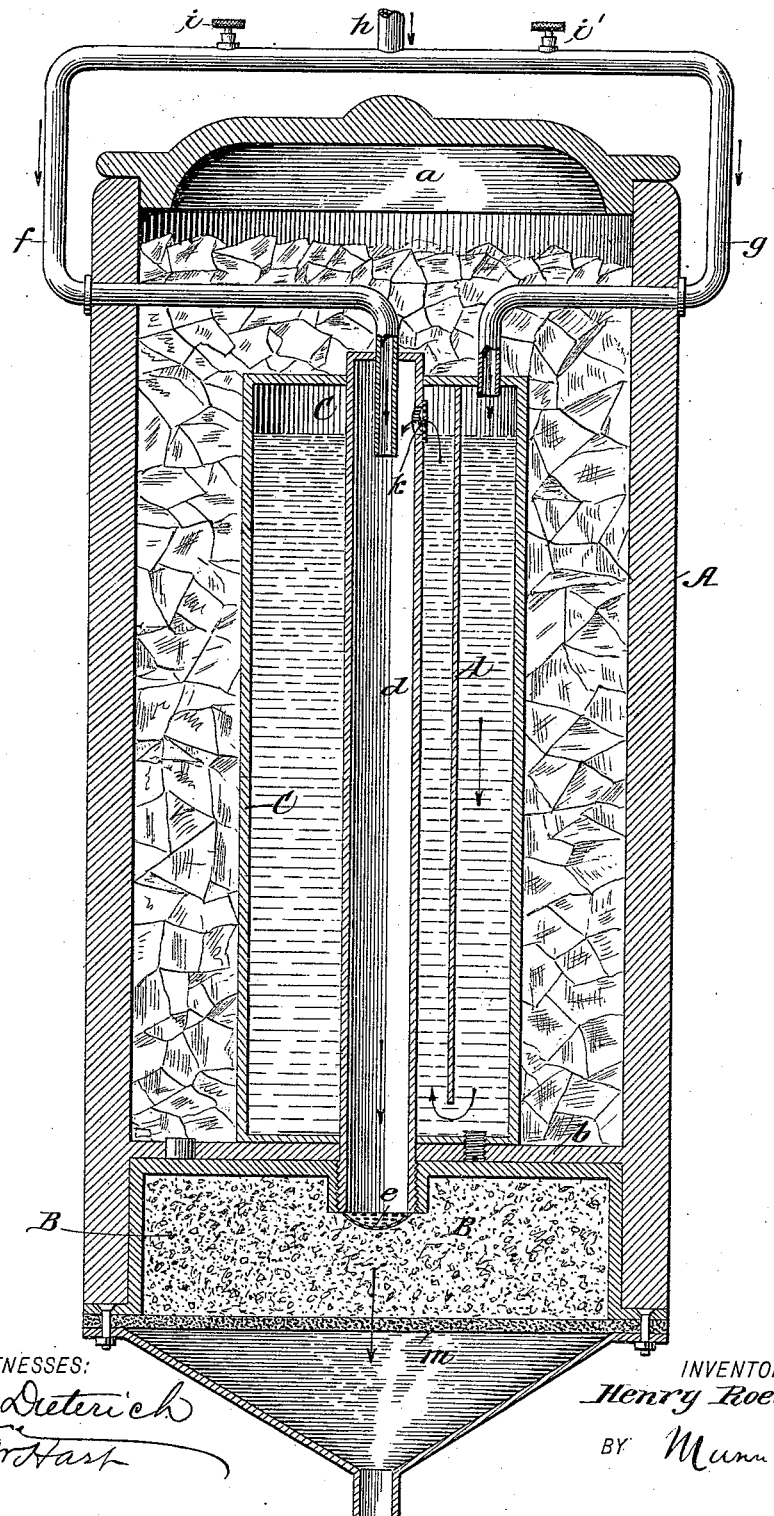

HENRY ROESKE, OF PHILADELPHIA, ASSIGNOR OF ONE-HALF TO ROBERT WETHERILL & CO., OF CHESTER, PENNSYLVANIA.

FILTERING APPARATUS.

SPECIFICATION forming part of Letters Patent No. 553,763, dated January 28, 1896.

Application filed October 6, 1892. Serial No. 448,063. (No model.)

*To all whom it may concern:*

Be it known that I, HENRY ROESKE, of Philadelphia, in the county of Philadelphia and State of Pennsylvania, have invented an Improved Filtering Apparatus, of which the following is a specification.

I combine a water-cooler with a filtering apparatus in such a manner that filtered water may be drawn directly from the water-supply pipes or from the cooler, as may be desired. The filtering medium is impregnated, as often as required to produce the desired effect, with a mineral salt, such as borax, and also with salicylic acid, in order to temporarily prevent or arrest fermentation of such impurities as may not be removed from the water by mechanical filtration.

In the accompanying drawing I show a central longitudinal section of the apparatus I employ.

A tank or box A of suitable size, preferably of cylindrical form, is provided with a removable cover $a$ and at its lower end with a filter B, arranged beneath a horizontal diaphragm $b$, which forms practically the bottom of the tank A. Within the latter, and supported and secured by a screw upon the diaphragm $b$, is an interior water vessel or receiver C that extends nearly to the top of the tank A, and is closed at both of its ends, save as hereinafter described.

$d$ is a tube that extends lengthwise of the vessel C through both ends of said vessel and also through an aperture in the diaphragm $b$ into the filter B, with which it is connected by a screw-joint. The lower end of this tube $d$ is provided with a wire screen $e$, while the upper end receives a water-supply pipe $f$ that extends laterally through the side of the main tank A. $g$ is a second branch of said water-supply pipe and which passes into the tank A and enters the top of vessel C. Both pipes $f$ and $g$ connect with a common supply-pipe $h$ and are respectively provided with cocks $i$ and $i'$, whereby the water can be cut off from either pipe $f$ or $g$ as desired. When water is allowed to pass in by the pipe $f$ it goes to the tube $d$ and then passes directly through the filter B to the outlet at the bottom of the tank A, while on the other hand if water be admitted by the pipe $g$ it passes first into the vessel C.

The upper part of the tube $d$ is provided with an opening $k$ to allow escape of the water from the vessel C into the tube $d$ and thence into the filter B. Thus if water be supplied to the vessel C by the pipe $g$ it will first fill said vessel and then overflow into the tube $d$. I have provided in the vessel C a pendent partition $l$, arranged between the outlet-opening $k$ and the inlet-pipe $g$, it being attached to the top of the vessel C and made of less length than the latter so that an opening or space is left between the lower ends of the said partition and vessel, as shown. By this arrangement I form a trap which prevents water passing directly from the tube $g$ to the outlet.

The space in the tank A around the vessel C is to be filled with ice for the purpose of cooling the water contained in interior vessel. When it is desired to draw the cooled water from the vessel C, the cock or valve $i'$ will be opened to admit water by the pipe $g$, and the vessel C being always full of water, and an amount of water corresponding to that admitted will be forced out through the tube $d$ and filter to the outlet, and a supply of water may be thus obtained for drinking purposes. On the other hand, if water is desired simply for cooking or other purposes than drinking, the cock $i$ in the pipe $f$ will be opened and the water will pass directly to the filter, and any desired quantity may be drawn without disturbance of the cold water.

The filter B is a hollow cylinder fitted with suitable filter material continuously saturated with certain mineral salts and salicylic acid serves to purify the water by attracting foreign matters and neutralizing the effects of organisms detrimental to health which some waters contain. They also prevent fermentation of the retained impurities in filters for a considerable time by their antiseptic property. The bottom of the filter is closed by a diaphragm M of perforated metal, asbestos plate, felt or other suitable material that allows the water to escape without carrying the granulated filter material with it.

In further explanation of my invention I will state that many impurities cannot be removed from water by mechanical filtration. Hence water may be very impure and potably deleterious when visually entirely clear and apparently pure. I have discovered that by the addition of salicylic acid and a mineral salt, such as borax, to impure water the fermentation of the contained impurities is prevented or arrested and thus the water is rendered potably harmless.

The quantity of the chemical agents required for a given quanity of water varies with the condition of the latter and the rapidity with which it passes through the filtering substance. If the water be very heavily loaded with foreign fermentitious matter held in suspension, a satisfactory result is obtained by adding one part, by weight, of borax and one part, by weight, of salicylic acid to one thousand parts of water, by weight. In practice, I continually saturate the filtering material with these chemical substances, and to enable this to be done in a practical manner I provide a receptable for each substance and place it above and in connection with the water channel or pipe $h$ at a point contiguous to the filter. Such receptacles are provided with adjustable discharge-valves for regulating the quantity of the substances delivered into said pipe $h$ from such receptacles in a given time. The said substances thus immediately pass into and are temporarily held in the filter-bed and mingle with the water and act on the foreign elements therein, as described.

What I claim is—

The combination, with the filtering substance and chamber containing the same, of a tank arranged above the latter, a separate water-chamber, or holder, contained in the tank, and provided with a central water-tube leading into the filter-chamber, and a pendent partition having an opening in its upper portion, and its lower end being free from the bottom of the water-chamber, thus forming a trap, and the supply-pipe having two branches, each provided with a valve, one branch connecting with the aforesaid tube and the other with the water-chamber at a point exterior to the partition, as shown and described.

HENRY ROESKE.

Witnesses:
A. G. SEYMOUR COOPER,
H. H. SUMAMON.